(12) United States Patent
Peran et al.

(10) Patent No.: US 11,416,770 B2
(45) Date of Patent: Aug. 16, 2022

(54) RETRAINING INDIVIDUAL-ITEM MODELS

(71) Applicant: International Business Machines Corporation, Armonk, NY (US)

(72) Inventors: Michael Peran, Scarsdale, NY (US); Josh Price, Lafayette, CO (US); Daniel Augenstern, Endwell, NY (US); Rahul Nahar, South Burlington, VT (US); Pankaj Srivastava, Bedford, NY (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 16/666,728

(22) Filed: Oct. 29, 2019

(65) Prior Publication Data

US 2021/0125098 A1     Apr. 29, 2021

(51) Int. Cl.
*G06F 21/00* (2013.01)
*G06N 20/00* (2019.01)
(Continued)

(52) U.S. Cl.
CPC .......... *G06N 20/00* (2019.01); *G06F 16/9535* (2019.01); *G06N 5/04* (2013.01); *G06Q 10/067* (2013.01); *G06Q 30/0631* (2013.01)

(58) Field of Classification Search
CPC .......... G06N 20/00; G06N 5/04; G06N 20/20; G06F 16/9535; G06Q 10/067; G06Q 30/0631
See application file for complete search history.

(56) References Cited

U.S. PATENT DOCUMENTS 8,099,376 B2   1/2012   Serrano-Morales et al.
9,183,465 B2   11/2015  Omer et al.
(Continued)

FOREIGN PATENT DOCUMENTS

WO     2018195667 A1   11/2018

OTHER PUBLICATIONS

Wei et al., "Collaborative Filtering and Deep Learning Based Recommendation System For Cold Start Items," Expert Systems with Applications, Oct. 2016, pp. 1-29.
(Continued)

*Primary Examiner* — Mahfuzur Rahman
(74) *Attorney, Agent, or Firm* — Jorge R. Maranto

(57) ABSTRACT

Embodiments of the present disclosure include a computer-implemented method and system for determining when to retrain an individual-item model within a recommendation engine. The computer-implemented method includes defining a consumer feature vector having attributes of historical consumers that impact an individual-item model. The computer-implemented method further includes calculating a historical feature vector relating to the historical consumers. The computer-implemented method also includes determining a retraining threshold for the individual-item model and calculating a new feature vector relating to new consumers. The new feature vector containing new attribute values of the new consumers and defined by the consumer feature vector. The computer-implemented method further includes determining a distance between the historical feature vector and the new feature vector and retraining the individual-item model upon determining that the distance between the historical feature vector and the new feature vector exceeds the retraining threshold.

20 Claims, 5 Drawing Sheets

(51) Int. Cl.
*G06F 16/9535* (2019.01)
*G06N 5/04* (2006.01)
*G06Q 30/06* (2012.01)
*G06Q 10/06* (2012.01)

(56) References Cited

U.S. PATENT DOCUMENTS

| | | | |
|---|---|---|---|
| 9,892,316 B2 | 2/2018 | Guan et al. | |
| 9,916,362 B2 | 3/2018 | Parundekar et al. | |
| 10,664,894 B2* | 5/2020 | Codella | G06Q 30/0643 |
| 10,755,291 B1* | 8/2020 | Sharma | G06Q 30/0201 |
| 11,080,596 B1* | 8/2021 | Makhijani | G06N 20/00 |
| 2014/0156568 A1 | 6/2014 | Ganguly et al. | |
| 2015/0058336 A1 | 2/2015 | Davis et al. | |
| 2016/0086206 A1* | 3/2016 | Churchill | G06F 16/9535 |
| | | | 705/7.32 |
| 2017/0024455 A1* | 1/2017 | Powell | H04L 67/306 |
| 2017/0177325 A1 | 6/2017 | Carranza et al. | |
| 2017/0323216 A1 | 11/2017 | Fano | |
| 2018/0012284 A1 | 1/2018 | Igarashi et al. | |
| 2018/0211270 A1 | 7/2018 | Wu et al. | |
| 2019/0392082 A1* | 12/2019 | Bell | G06N 3/08 |
| 2020/0285645 A1* | 9/2020 | Sandstrom | G06K 9/6269 |
| 2021/0125098 A1* | 4/2021 | Peran | G06N 20/00 |
| 2021/0357959 A1* | 11/2021 | Cella | G06Q 10/0631 |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

RETRAINING INDIVIDUAL-ITEM MODELS

BACKGROUND

The present disclosure relates to recommendation engines, and more specifically, to optimizing the retraining cycles of individual-item models within a recommendation engine.

Recommendation engines, or recommender systems, are systems that recommend or suggest a particular product, service, or entity. Two common approaches of recommendation engines are content-based filtering and collaborative filtering. Content-based filtering uses similarity between items to recommend items similar to what the consumer likes. Collaborative filtering uses the similarities between consumer attributes data and items to provide recommendations. Two types of engines can be utilized when making a recommendation. The first type of recommendation engine is user-centric recommendations. User-centric recommendations determine the similarities or relationships between items by clustering similar items or by calculating the similarity of items, or both. Then items to be recommended to each user (consumer) are selected based on similarity to items previously liked by a user. The user-centric recommendation engines are usually implemented as a single model or a relatively small number of models.

The second type of engine is an item-centric recommendation. Item-centric engines recommend items to user based on the similarity of the users. For example, if a user purchases a book or an item, the item-centric engine may recommend the same book or the same item to a similar user. An item-centric engine may recommend the same book or the same item to a similar user. An item-centric engine can be implemented as a large number of individual-item models selecting what users are more likely to select, or consume, a given item. The items with the highest conditional probability to be consumed are recommended to a user. Other types of recommendation engines exist. For example, knowledge-based engines and hybrid engines are some of the other types of recommendation engines.

SUMMARY

Embodiments of the present disclosure include a computer-implemented method for determining when to retrain an individual-item model within an item-centric recommendation engine. The computer-implemented method includes defining a consumer feature vector based on attributes of consumers that impact an individual-item model. The computer-implemented method further includes calculating a historical feature vector relating to the historical consumers. The historical feature vector is based on attribute values of the historical consumers. The computer-implemented method also includes determining a retraining threshold for the individual-item model and calculating a new feature vector relating to new consumers. The new feature vector based on new attribute values of the new consumers. The computer-implemented method further includes determining a distance between the historical feature vector and the new feature vector and retraining the individual-item model upon determining that the distance between the historical feature vector and the new feature vector exceeds the retraining threshold.

Further embodiments are directed to a computer program product for determining when to retrain an individual-item model within a recommendation engine, which include a computer readable storage medium having program instruction embodied therewith, the program instructions executable by a processor to cause the processor to perform a method. The method includes defining a consumer feature vector based on attributes of consumers that impact an individual-item model. The method further includes calculating a historical feature vector relating to the historical consumers. The historical feature vector is based on attribute values of the historical consumers. The method also includes determining a retraining threshold for the individual-item model and calculating a new feature vector relating to new consumers. The new feature vector based on new attribute values of the new consumers. The method further includes determining a distance between the historical feature vector and the new feature vector and retraining the individual-item model upon determining that the distance between the historical feature vector and the new feature vector exceeds the retraining threshold.

Additional embodiments are directed to a recommendation training system for determining when to retrain an individual-item model within a recommendation engine, including at least one processing component and at least one memory component. The recommendation training system can be used in conjunction with recommendation engines implementing individual-item models. The recommendation training system is configured to define a consumer feature vector for each individual-item model relating to an item. The feature vector can include both categorical and numerical consumer attributes. The recommendation training system is further configured to calculate a historical feature vector based on historical consumer data and a new feature vector based on new consumer data. Both the historical feature vector and the new feature vector include the same consumer attributes defined by the consumer feature vector. When the new feature vector exceeds a threshold of difference from the historical feature vector, the recommendation training system can retrain a model using the new consumer data.

BRIEF DESCRIPTION OF THE DRAWINGS

These and other features, aspects, and advantages of the embodiments of the disclosure will become better understood with regard to the following description, appended claims, and accompanying drawings where:

Figure 1:
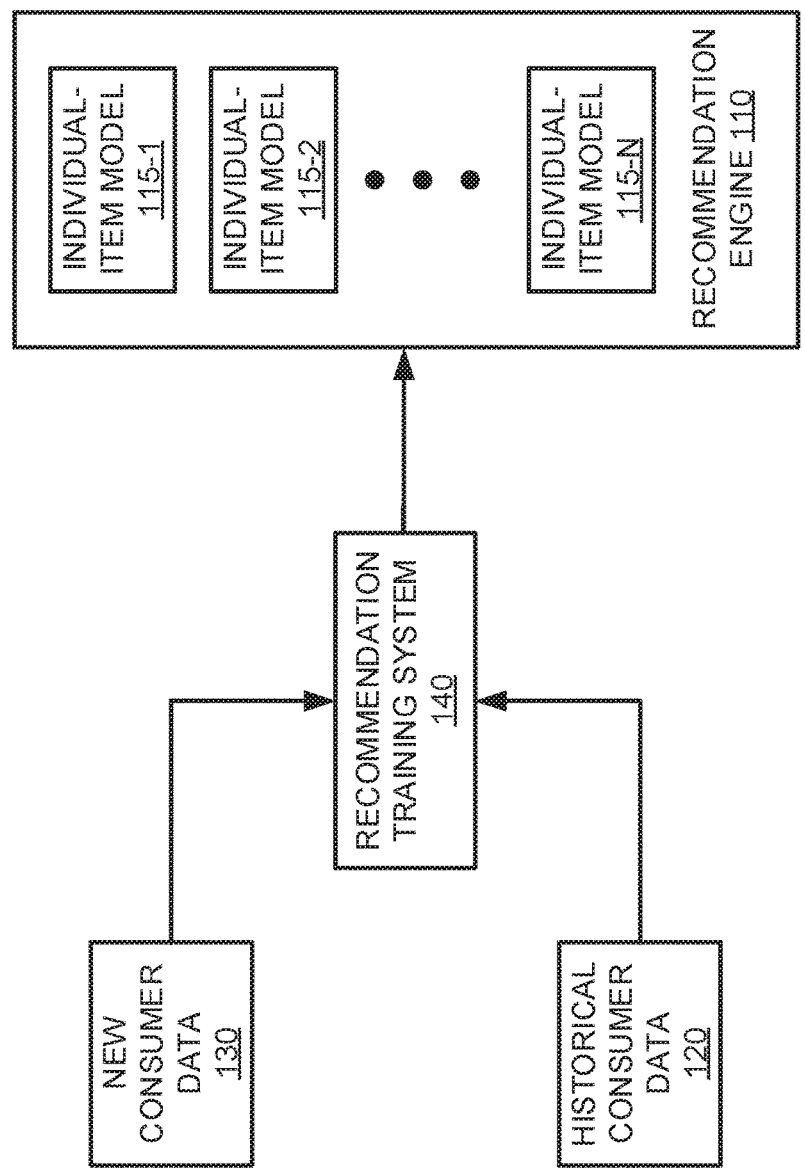
FIG. 1 illustrates a block diagram of a recommendation environment, in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within

DETAILED DESCRIPTION

The present disclosure relates to recommendation models, and more specifically, to optimizing the retraining cycles of individual-item models within a recommendation engine. While the present disclosure is not necessarily limited to such applications, various aspects of the disclosure may be appreciated through a discussion of various examples using this context.

Recommendation engines are a type of information filtering technology, commonly used to present information on items and products that are likely to be of interest to a consumer. Items, also known as documents, are entities a system recommends. For example, a recommendation engine may suggest an item such as a retail product, a learning activity, services, games, online entertainment, travel packages, restaurants, and the like. Organizations can offer these items to consumers individually, collectively, or any combination thereof. A consumer can be individuals such as a profiled user, an online viewer, a shopper, a seller, an employee of an organization, and the like.

A successful recommendation by a recommendation engine can be viewed as any action taken by a consumer on the suggested item. For example, an action can be the consumer clicking on the item, adding items to a wish list, adding items to their shopping carts, completing a learning activity, signing up for a course, and the like. Depending on the organization, successful recommendations can be adjusted based on the action taken. If an organization wishes for their employees to complete more online training, then an action can be defined as a consumer completing a training course. However, if an organization simply wants more exposure for an item, then a successful recommendation can be a consumer clicking on the item.

The models used by a recommendation engine can be trained with consumer attributes to recommend items that have the highest probability a consumer will take a desired action. Types of consumer attributes include historical consumer attributes, geographic locations, devices used to access offerings (e.g., computer, laptop, smartphone, etc.), education level, occupation, skills, age, gender, income, affiliations, historical purchases, previous actions taken, wish lists, and the like.

Typically, traditional recommendation engines, such as collaborative filtering, content-based filtering, and hybrid models, need to be retrained when new information about consumers becomes available. Recommendation systems can be retrained when a certain amount of new consumer data becomes available. The new consumer data can potentially alter the recommendations of items. If a recommendation engine retrains infrequently, i.e. waits until there is a vast amount of new consumer data, such a retraining process may miss consumer opportunities due to decreased accuracy in recommendations. However, if a recommendation engine frequently retrains when little new consumer data becomes available, the system may retrain too frequently which could result in system slow down or inefficient resource utilization.

A recommendation engine can include a plurality of individual-item models that recommend items based on consumer data. An individual-item model can be configured for each item being offered or per a subset of items being offered. For example, an individual-item model may be trained to recommend a particular book or learning activity, or the individual-item model may be trained to recommend books of a particular genre or learning activities of a particular field. Recommendations implementing individual-item models typically have a higher success rate of desired actions on recommended items over other types of recommendation engines. However, in situations where a large number of items are being offered in conjunction with a vast amount of consumer data, training individual-items models can become very time consuming. In some instances, training a recommendation engine implementing individual-item models can take several days.

Additional limitations on efficiency remain in recommendation engines implementing individual-item models. Retraining the individual-item models may be infeasible due to the extensive amount of time required to retrain multiple individual-item models.

Embodiments of the present disclosure may overcome the above, and other, problems by using a recommendation training system. The recommendation training system can be used in conjunction with recommendation engines implementing individual-item models. The recommendation training system is configured to define a consumer feature vector for an individual-item model relating to an item. The recommendation training system is further configured to calculate a historical feature vector based on historical consumer data. The historical feature vector can include attributes defined by the consumer feature vector. In addition, the recommendation training system is configured to calculate a new feature vector based on new consumer data. The new feature vector can also include attributes defined by the consumer feature vector. When the new feature vector exceeds a threshold of difference from the historical feature vector, the recommendation training system can retrain the model using the new consumer data.

More specifically, the recommendation training system described herein evaluates whether new consumer data is significantly different from historical consumer data to justify retraining an individual-item model. Accordingly, as new consumer data is being received, the recommendation training system evaluates the new consumer data to see if that data exceeds a predetermined retraining threshold. By evaluating the difference between new consumer data and historical consumer data, the recommendation training system described herein improves efficiency by retraining individual-item models only when the new consumer data is significantly different from the historical consumer data.

By way of example, an organization implementing a recommendation engine with individual-item models trained with historical consumer data. An individual-item model for a learning module relating to artificial intelligence is trained with the historical consumer data. The historical consumer data can include information regarding employees of the organization. The majority of employees taking the learning module relating to artificial intelligence are data scientists. As such, the individual-item model recommends the learning module to other data scientists within the organization. However, new consumer data is received that shows that employees in the marketing department of the organization are now taking the learning module. The recommendation training system can compare the historical consumer data with the new consumer data to determine whether or not to retrain the individual-item model. Upon determining that the new consumer data exceeds a retraining threshold, the individual-item model can be retrained using the new consumer data. In this example, the new consumer data includes employees in the marketing department. Once trained, the individual-item model can begin recommending the learning module to marketing employees.

Embodiments of the present disclosure include consumer feature vectors. The consumer feature vectors are created to analyze the difference between historical consumer data and new consumer data. In some embodiments, the consumer feature vectors include categorical and numerical attributes of consumers as inputs. A categorical attribute can include information such as geographical location, type of accessing devices (e.g., laptop, tablet, cellphone, etc.), university attended, job title, and the like. A numerical attribute can include information such as age, year of graduation, salary, and the like. For example, a consumer feature vector can include information such as age, salary, geographical location, and accessing device when defined.

Embodiments of the present disclosure include a historical feature vector and new feature vector. The historical feature vector can be calculated based on the attributes defined by a consumer feature vector. The historical feature vector can include averaged attributes taken from the historical consumer data. The new feature vector can be calculated based on attributes defined by a consumer feature vector. The new feature vector can include averaged attributes taken from the new consumer data.

In some embodiments, a retraining threshold is defined by the standard deviation of the historical consumer feature vectors. For example, a retraining threshold can be defined as a certain percentage of standard deviation of the historical feature vectors. When the difference between the new feature vectors and the historical feature vectors exceed the retraining threshold, the individual-item model can be retrained.

It is to be understood that the aforementioned advantages are example advantages and should not be construed as limiting. Embodiments of the present disclosure can contain all, some, or none of the aforementioned advantages while remaining within the spirit and scope of the present disclosure.

FIG. 1 is a block diagram illustrating a recommendation environment 100, in accordance with embodiments of the present disclosure. The recommendation environment 100 includes a recommendation engine 110, historical consumer data 120, new consumer data 130, and a recommendation training system 140. The recommendation engine 110 includes an individual-item model 115-1, 115-2, and 115-N (which generally, or collectively, may be referred to as individual-item model 115), where N is a variable integer representing any number of possible individual-item models 115.

The recommendation engine 110 is a component of a recommendation environment 100 configured to provide recommendations of items to consumers, in accordance with embodiments of the present disclosure. The recommendation engine 110 is a type of machine learning model configured to filter information to suggest items to consumers with a conditional probability that the consumer will take an action on the item. To determine a suggested item, the recommendation engine 1100 can utilize various methods of recommendation. For example, the recommendation engine 110 can employ methods such as collaborative filtering, content-based filtering, hybrid recommendation filtering, and the like. In some embodiments, the recommendation engine 110 includes a plurality of individual-item models 115, wherein each individual-item model 115 is configured to recommend one item within a corpus of items offered by an organization.

The individual-item model 115 is a component of the recommendation engine 110 configured to recommend an item or subset of items to a consumer, in accordance with embodiments of the present disclosure. The individual-item models 115-1, 115-2, and 115-N can employ various machine learning techniques in determining whether to suggest an item to a consumer. Machine learning techniques can comprise algorithms or models that are generated by performing supervised, unsupervised, or semi-supervised training on a dataset, and subsequently applying the generated algorithm or model to generate a conditional probability that a consumer will take an action on an item. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the individual-item model 115 implement machine learning techniques that provide weights for the features used in determining a conditional probability for an item. A feature can be considered an input variable used by the individual-item model 115 in determining a conditional probability. The features can also be consumer attributes that impact the conditional probability of the individual-item model 115. For example, an individual-item 115 configured to suggest a learning module may use consumer attributes relating to a consumer that include education level, job title, business unit, and the like. Based on the machine learning technique, the individual-item model 115 may weigh the consumer attributes based on the contribution a consumer attribute may have on determining a conditional probability.

The historical consumer data 120 is data used by recommendation engine 110 to train the individual-item models 115 in making recommendations, in accordance with embodiments of the present disclosure. The historical consumer data 120 can include any consumer attributes an organization maintains and analyzes. Consumer attributes include attributes such as occupation, education level, skills, age, gender, salary, business unit, historical purchases, and the like. The consumer attributes can be numerical attributes such as age, salary, and registration date. The consumer attributes can also be categorical attributes such as business unit, skills, and education level.

The new consumer data 130 is data from new consumers selecting items offered by an organization, in accordance with embodiments of the present disclosure. The new consumer data 130 can include any consumer attributes an organization maintains and analyzes. Consumer attributes include attributes such as occupation, education level, skills, age, gender, salary, business unit, historical purchases, and the like. The consumer attributes can be numerical attributes such as age, salary, and registration date. The consumer attributes can also be categorical attributes such as business unit, skills, and education level.

The recommendation training system 140 is a component of the recommendation environment 100 configured to determine when to retrain the individual-item model 115 within the recommendation engine 110, in accordance with embodiments of the present disclosure. The recommendation training system 140 is further configured to define a consumer feature vector for an individual-item model 115. The consumer feature vector can include consumer attributes which impact the individual-item model 115 in calculating a conditional probability for an item. A consumer attribute can impact the individual-item model 115 if the individual-item model 115 utilizes the consumer attribute as a feature when calculating a conditional probability of an item.

The recommendation training system 140 is further configured to calculate a historical feature vector. The historical feature vector can include attribute values of consumer attributes relating to historical consumers found in the historical consumer data 120 and defined by the consumer feature vector. In some embodiments, the historical feature vector includes both numerical attributes and categorical attributes relating to historical consumers within the historical consumer data 120.

For example, a consumer feature vector can be defined to include the consumer attributes of time zone, operating system, and years since college graduation. In this example, it is assumed that historical consumers can be either in the eastern time zone tE, in the central time zone tC, in the mountain time zone tM, or in the pacific time zone tP. It is also assumed that consumers use either Windows W, Macintosh OS Mac, Android A, or Apple iOS iOS. In addition, it is assumed that the years after college graduation of the consumer is a continuous numerical attribute E In this example, the dimensionality J of our consumer feature vector $\vec{C}$ is J=4+4+1=9. Thus, $\vec{C}$ is defined according to Vector 1:

$$\vec{C}=(tE, tC, tM, tP, W, \text{Mac}, A, \text{iOS}, Y) \quad \text{Vector 1}$$

It can also be assumed that all consumers in this example are college graduates, and the maximum is 60 years. Thus, the feature vector component Y is normalized as defined by Equation 1:

$$Y=[\text{years after college}]/60 \quad \text{Equation 1}$$

As such, for a consumer in this example that has attributes of being in the eastern time zone, with an operating system of android, and being twelve years after college graduation, their consumer feature vector $\vec{C}$ may be defined as Vector 2:

$$\vec{C}=(tE=1, tC=0, tM=0, tP=0, W=0, \text{Mac}=0, A=1, \text{iOS}=0, 0.2) \quad \text{Vector 2}$$

In this example, the operating system attribute is weighted three times more than the other attributes. As such, the consumer feature vector $\vec{C}$ may be defined as Vector 3:

$$\vec{C}=(tE=1, tC=0, tM=0, tP=0, W=0, \text{Mac}=0, A=3, \text{iOS}=0, 0.2) \quad \text{Vector 3}$$

If, in this example, a new consumer is introduced with an attribute value that is out-of-scope, the feature vector dimensionality is needed to be increased. For example, if a new consumer has an operating system of Linux L and no other historical consumer used Linux, then the dimensionality J of the consumer feature vector $\vec{C}$ is increased by 1 to J=10 as represented in Vector 4:

$$\vec{C}=(tE=1, tC=0, tM=0, tP=0, W=0, \text{Mac}=0, A=0, \text{iOS}=0, L=1, 0.2) \quad \text{Vector 4}$$

In some embodiments, the historical feature vector includes attributes values that are averaged values for the consumer attributes taken from the historical consumer data 120 and defined by the consumer feature vector. In some embodiments, the averaged values are defined according to Equation 2:

$$\vec{F} = \frac{\sum_{m=1}^{M} \vec{C}_m}{M} \quad \text{Equation 2}$$

Where the averaged historical feature vector $\vec{F}$ is calculated by the average of M historical consumer feature vectors $\vec{C}_m$. In some embodiments, the retraining threshold is defined according to Equation 3:

$$\sigma = \sqrt{\text{var}(\vec{C}-\vec{F})} \quad \text{Equation 3}$$

Where the retraining threshold is the standard deviation of length $\sigma$ and where $\text{var}(\vec{C}-\vec{F})$ is defined according to Equation 4:

$$\text{var}(\vec{C} - \vec{F}) = \frac{\sum_{m=1}^{M} \|\vec{C}_m - \vec{F}\|^2}{M - 1} \quad \text{Equation 4}$$

Where $\|\vec{C}_m - \vec{F}\|$ is defined as a vector length from historical feature vector $\vec{C}_m$ and averaged historical feature vector $\vec{F}$.

For example, a consumer feature vector is defined to include the consumer attributes of time zone, operating system, and years after college graduation. In this example, assume that 30% of historical consumers are in the eastern time zone, 20% are in the central time zone, 10% are in the mountain time zone, and 40% are in the pacific time zone. Also assume that 40% use Windows, 20% use Mac OS, 10% use Android OS, and 10% use Apple iOS, and the average year after college graduation is six years. As such, an average historical feature vector may be defined as Vector 5:

$$\vec{F}=(tE=0.3, tC=0.2, tM=0.1, tP=0.4, W=0.6,$$
$$Mac=0.2, A=0.1, iOS=0.1, Y=0.1) \quad \text{Vector 5}$$

The recommendation training system 140 is further configured to determining a retraining threshold. The retraining threshold is a threshold indicates a point in which new consumers can be considered significantly different from historical consumers. A significant difference in consumers can trigger the individual-item model 115 to be retrained. In some embodiments, the recommendation training system 140 determines the retraining threshold by calculating the standard deviation ($\sigma$) of the historical consumer data 120. The standard deviation can be used to quantify the amount of variation or dispersion for a set of data values. Other distribution factors, such as mean, skewness, and kurtosis can also be used as a measure of difference. The retraining threshold can be set a percentage of the standard deviation in which the distance between new consumers and historical consumers must meet. For example, the retraining threshold can be defined as $0.1\%\sigma$, $1\%\sigma$, $5\%\sigma$, $10\%\sigma$, and the like.

The recommendation training system 140 is further configured to calculate a new feature vector. The new feature vector can include attribute values of consumers found in the new consumer data 130 and defined by the consumer feature vector. In some embodiments, the new feature vector includes both numerical attributes and categorical attributes relating to new consumers within the new consumer data 130.

In some embodiments, the new feature vector includes attributes values that are averaged values for the consumer attributes taken from the new consumer data 130 and defined by the consumer feature vector. In some embodiments, the averaged values are defined according to Equation 5:

$$\vec{G}(N) = \frac{\sum_{n=1}^{N} \vec{C}_n}{N} \quad \text{Equation 5}$$

Where the averaged new feature vector $\vec{G}(N)$ is calculated by the average of N new consumer feature vectors $\vec{C}_n$. In some embodiments, the averaged new feature vector is stored by the recommendation training system 140. The averaged new feature vector can be dynamically updated as new consumer data is received. For example, if an individual-item model 115 is not retrained with the new consumer data 130, as a new consumer $\vec{C}_{N+1}$ is received, the number of new consumers increases by 1. As such, new feature vector can be calculated according to Equation 6:

$$\vec{G}(N+1) = \frac{N*\vec{G}(N)+\vec{C}_{N+1}}{N+1} \quad \text{Equation 6}$$

Equation 5 allows the recommendation training system 140 to perform computations quickly and reduce the amount of time required to determine whether or not to retrain an individual-item model 115.

The recommendation training system 140 is further configured to determine a distance between an averaged historical feature vector and a retrained feature vector. In some embodiments, the distance $\gamma$ is defined according to Equation 7:

$$\gamma = \frac{N}{M+N} \left\| \vec{G}(N) - \vec{F} \right\| \quad \text{Equation 7}$$

Where vector $\vec{F}$ is defined by Equation 1, vector $\vec{G}(N)$ is defined by Equation 4, M represents the number of historical consumers, and where N represents the number of new consumers. In some embodiments, $\gamma$ can be compared to the retraining threshold to determine whether to retrain the individual-item model 115.

In some embodiments, the recommendation training system 140 determines a distance between a new consumer and the nearest neighbor among historical consumers by sampling without replication. The nearest neighbor can be defined as a proximity search in finding the point in a given set that is closest (or most similar) to a given point. Determining the nearest neighbor can be determined in various ways. For example, the nearest neighbor can be determined using a linear search, space partitioning, a greedy search, locality sensitive hashing, nearest neighbor search in space with small intrinsic dimension, projected radial search, vector approximation search, compression/clustering-based search. Various variants of nearest neighbor can also be employed such as k-nearest neighbors, approximate nearest neighbor, nearest neighbor distance ratio, fixed-radius near neighbors, all nearest neighbors, and the like. In some embodiments, the distance is defined according to Equation 8:

$$D_n = \left\| \vec{C}_n - \vec{C}_m \right\| \quad \text{Equation 8}$$

$D_n$ is defined as the distance between new consumer vector $\vec{C}_n$ and its nearest neighbor $\vec{C}_m$ among historical consumers. To increase computational speed, a new consumer $\vec{C}_n$ finds its nearest neighbor $\vec{C}_m$ among historical consumers that were not nearest neighbors of previous new consumers. There is no comparison of nearest neighbors across new consumers to minimize the sum of distances $D_n$. The recommendation training system 140 can then measure the difference between new consumers and historical consumers by averaging the distance $D_n$ for each new consumer. When the difference between the new consumers and existing consumers exceed or reach a retraining threshold, the individual-item model can be retrained.

In some embodiments, a new consumer $\vec{C}_n$ finds its nearest neighbor $\vec{C}_m$ among historical consumers by sampling with replication. To increase computational accuracy, a new consumer $\vec{C}_n$ finds its nearest neighbor $\vec{C}_m$ comparing distances between all new consumers and all historical consumers to minimize the sum of distances $D_n$. The recommendation training system 140 can then measure the difference between new consumers and historical consumers by averaging the distance $D_n$ for each new consumer. When the difference between the new consumers and existing consumers exceed or reach a retraining threshold, the individual-item model can be retrained.

Figure 2:
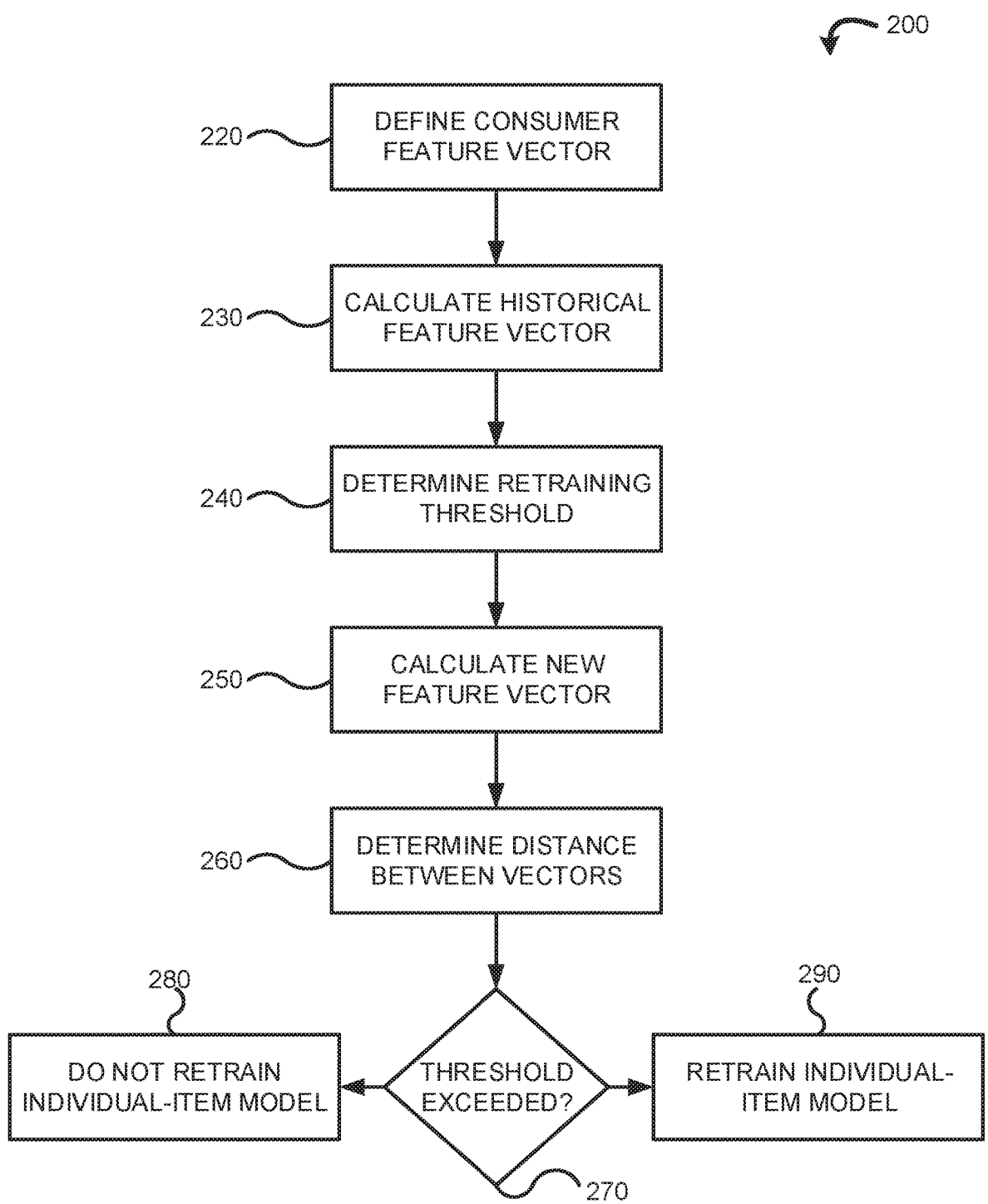
FIG. 2 is a flow diagram of a retraining recommendation engine process, in accordance with embodiments of the present disclosure.

FIG. 2 is a flow diagram illustrating a process 200 of determining when to retrain an individual-item model, in accordance with embodiments of the present disclosure. The process 200 may be performed by hardware, firmware, software executing on a processor, or a combination thereof. For example, any or all the steps of the process 200 may be performed by one or more processors embedded in a computing device.

The recommendation training system 140 defines a consumer feature vector. This is illustrated at step 220. The consumer feature vector can include consumer attributes which impact an individual-item model 115 in calculating a conditional probability for an item. For example, if an individual-item model 115 utilizes consumer attributes, such as gender, age, and occupation, as features in determining a conditional probability of an item, then the consumer feature vector can be defined to include those consumer attributes.

A historical feature vector is calculated based on the consumer attributes defined by the consumer feature vector. This is illustrated at step 230. The historical feature vector can include attribute values of historical consumers found in the historical consumer data 120 and defined by the consumer feature vector. In some embodiments, the historical feature vector is calculated as an averaged historical feature vector. The attributes values can be averaged values for the consumer attributes taken from the historical consumer data 120 and defined by the consumer feature vector. In some embodiments, the historical feature vector is defined by Equation 2.

In some embodiments, the historical feature vector is the closest in similarity historical consumer to a new feature vector or a new consumer. For example, the historical feature vector can be determined using nearest neighbor search by comparing the consumer attributes of the new consumer to the historical consumers. In some embodiments, the historical consumer vector is the closest in similarity among historical consumers that were not nearest neighbors to previous new consumers. In some embodiments, the historical consumer vector is the closest in similarity among all historical consumers.

A retraining threshold is determined. This is illustrated at step 240. The retraining threshold can be determined by the recommendation training system 140 or predetermined prior to the evaluation of consumer data. In some embodiments, a percentage of a standard deviation is used as the retraining threshold. For example, the standard deviation can be determined using Equation 3.

A new feature vector is calculated based on the consumer attributes defined by the consumer feature vector. This is illustrated at step 250. The new feature vector can include attribute values of new consumers found in the new consumer data 130 and defined by the consumer feature vector. In some embodiments, the new feature vector is calculated as an averaged new feature vector. The attributes values can be averaged values for the consumer attributes taken from the new consumer data 130 and defined by the consumer feature vector. In some embodiments, the historical feature vector is defined by Equation 6.

A distance is determined between the historical feature vector and the new feature vector. This is illustrated at step 260. The distance can be the amount of difference the new feature vector is from the historical feature vector. In some embodiments, the distance is determined by difference between an averaged historical feature vector and an averaged new feature vector and defined by Equation 7. In some embodiments, the distance is a generalized average distance of the new consumer vector to the nearest neighbor historical consumer vector.

The distance is evaluated to determine whether it meets or exceeds the retraining threshold. This is illustrated at step 270. If the distance is determined to not exceed the retraining threshold then the individual-item model is not retrained. This is illustrated at step 280. However, if the distance exceeds, or meets, the retraining threshold, then the individual-item model is retrained with the new consumer data 130. This is illustrated at step 290.

Figure 3:
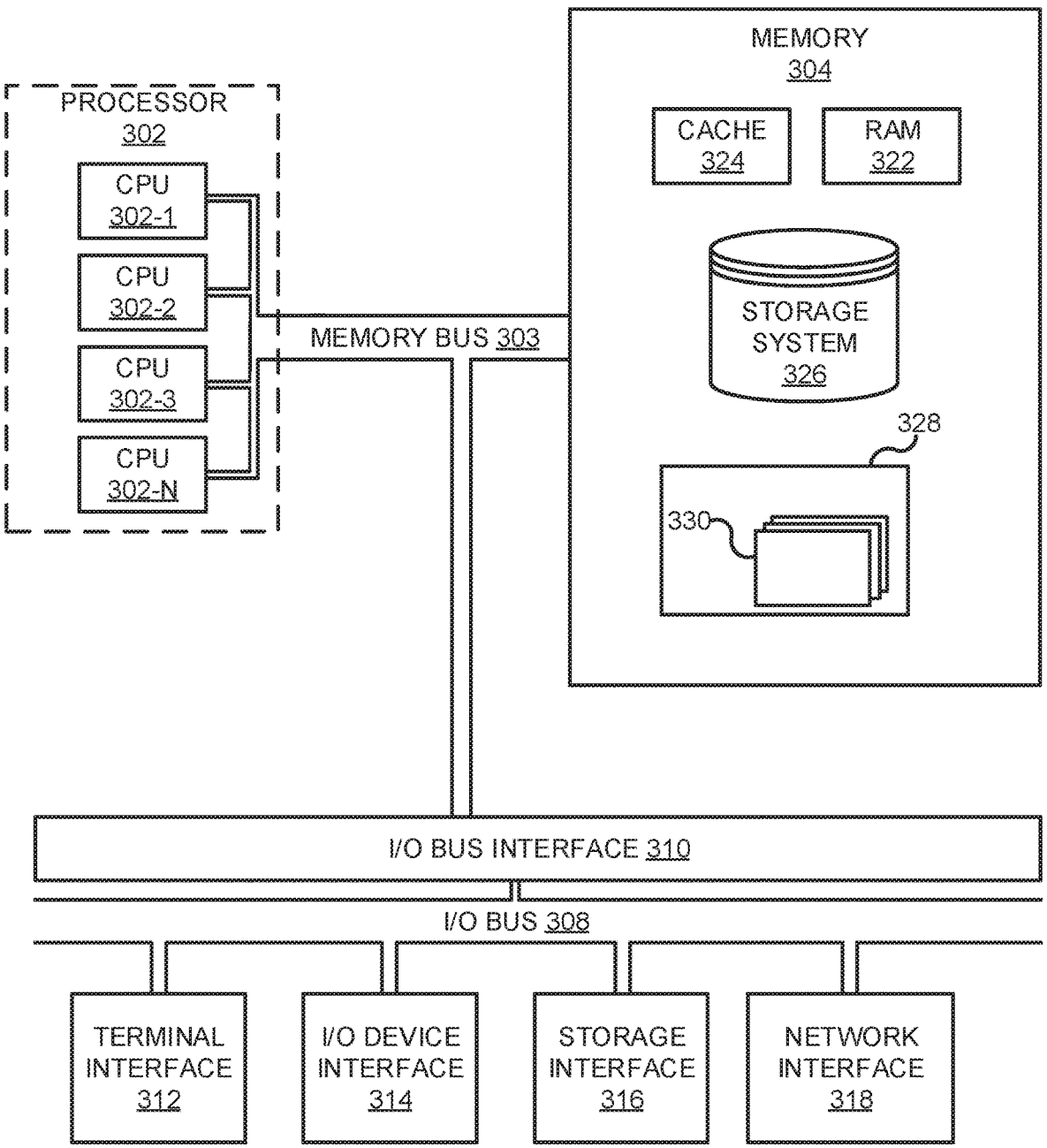
FIG. 3 illustrates a block diagram of an example computer system that may be used in implementing one or more of the methods, tools, and modules, and any related functions, described herein, in accordance with embodiments of the present disclosure.

Referring now to FIG. 3, shown is a high-level block diagram of an example computer system 300 (e.g., the recommendation training system 140) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 300 may comprise one or more processors 302, a memory 304, a terminal interface 312, a I/O (Input/Output) device interface 314, a storage interface 316, and a network interface 318, all of which may be communicatively coupled, directly or indirectly, for inter-component communication via a memory bus 303, a I/O bus 308, and an I/O bus interface 310.

The computer system 300 may contain one or more general-purpose programmable central processing units (CPUs) 302-1, 302-2, 302-3, and 302-N, herein generically referred to as the processor 302. In some embodiments, the computer system 300 may contain multiple processors typical of a relatively large system; however, in other embodiments the computer system 300 may alternatively be a single CPU system. Each processor 301 may execute instructions stored in the memory 304 and may include one or more levels of on-board cache.

The memory 304 may include computer system readable media in the form of volatile memory, such as random-access memory (RAM) 322 or cache memory 324. Computer system 300 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the processors 302, the memory 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in some embodiments, contain multiple I/O bus interface units, multiple I/O buses, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 300 may be a multi-user mainframe computer system, a single-user system, or a server computer or similar device that has little or no direct user interface, but receives requests from other computer systems (clients). Further, in some embodiments, the computer system 300 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
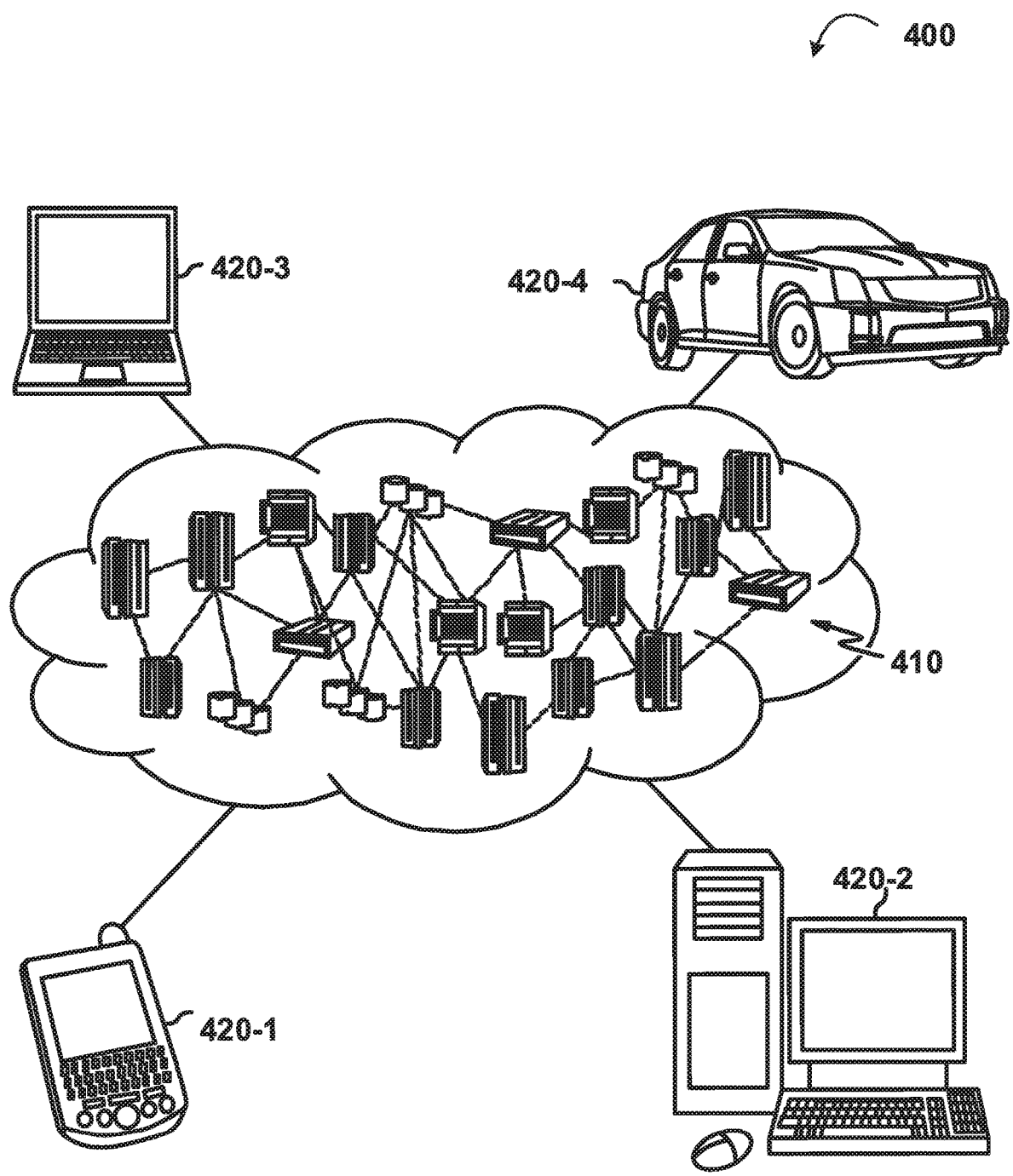
FIG. 4 depicts a cloud computing environment, in accordance with embodiments of the present disclosure.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 420-1 to 420-4 shown in FIG. 4 are intended to be illustrative only and that computing nodes 10 and cloud computing environment 400 can communicate with any type of computerized device over any type of network and/or network addressable connection (e.g., using a web browser).

Figure 5:
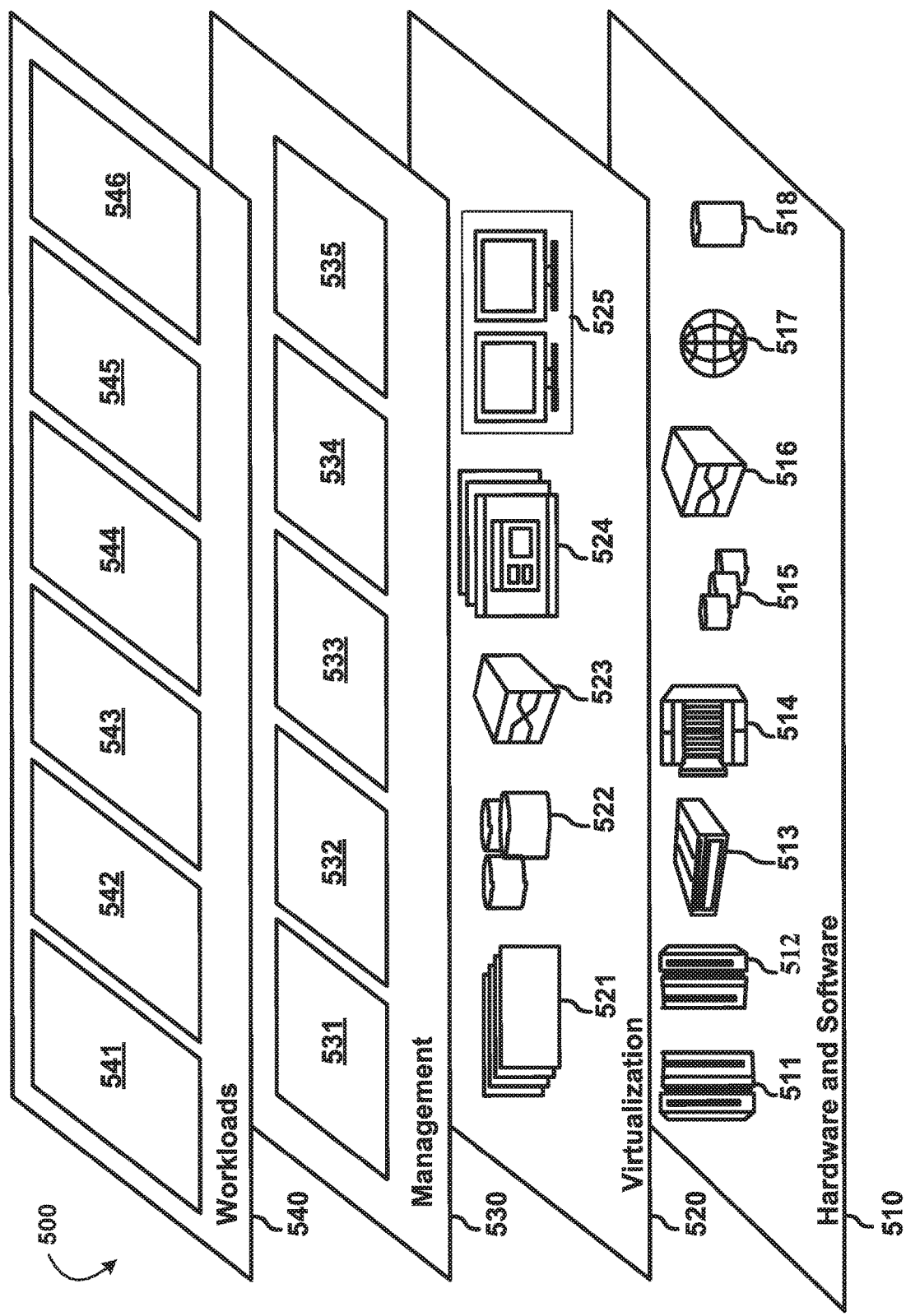
FIG. 5 depicts abstraction model layers, in accordance with embodiments of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 may provide the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include: mapping and navigation 541; software development and lifecycle management 542; virtual classroom education delivery 543; data analytics processing 544; transaction processing 545; and recommendation engine retraining processing 546 (e.g., the recommendation training system 140).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
defining a consumer feature vector having attributes of historical consumers that impact an individual-item model;
calculating a historical feature vector relating to the historical consumers, the historical feature vector containing attribute values for the attributes defined by the consumer feature vector;
determining a retraining threshold for the individual-item model;
calculating a new feature vector relating to new consumers, the new feature vector containing new attribute values for the attributes defined by the consumer feature vector;
determining a distance between the historical feature vector and the new feature vector; and
retraining the individual-item model upon determining that the distance between the historical feature vector and the new feature vector exceeds the retraining threshold.

2. The computer-implemented method of claim 1, wherein the consumer feature vector includes numerical attributes of the historical consumers and categorical attributes of the historical consumers.

3. The computer-implemented method of claim 1, wherein the attribute values are averages taken from the attributes of the historical consumers, and wherein the new attribute values are the averages taken from the attributes of the new consumers.

4. The computer-implemented method of claim 3, wherein the distance is a length of difference between the historical feature vector and the new feature vector.

5. The computer-implemented method of claim 1, wherein the historical feature vector is a nearest neighbor to the new feature vector.

6. The computer-implemented method of claim 5, wherein the distance is a generalized average distance between the historical feature vector and the new feature vector.

7. The computer-implemented method of claim 1, wherein the historical feature vector is a nearest neighbor to the new feature vector, wherein the nearest neighbor is determined by sampling the historical consumers and comparing distances from each of the historical consumers.

8. The computer-implemented method of claim 7, wherein the distance is a generalized average distance between the historical feature vector and the new feature vector.

9. A computer program product comprising a computer readable storage medium having program instructions embodied therewith, the program instructions executable by a processor to cause the processor to perform a method comprising:
defining a consumer feature vector, wherein the consumer feature vectors includes attributes of historical consumers that impact an individual-item model;

calculating a historical feature vector relating to the historical consumers, the historical feature vector having attribute values of the attributes defined by the consumer feature vector;

determining a retraining threshold for the individual-item model;

calculating a new feature vector relating to new consumers, the new feature vector having new attribute values of the attributes defined by the consumer feature vector;

determining a distance between the historical feature vector and the new feature vector; and retraining the individual-item model upon determining that the distance between the historical feature vector and the new feature vector exceeds the retraining threshold.

10. The computer program product of claim 9, wherein the consumer feature vector includes numerical attributes of the historical consumers and categorical attributes of the historical consumers.

11. The computer program product of claim 9, wherein the attribute values are averages taken from the attributes of the historical consumers, and wherein the new attribute values are the averages taken from the attributes of the new consumers.

12. The computer program product of claim 11, wherein the distance is a length of difference between the historical feature vector and the new feature vector.

13. The computer program product of claim 9, wherein the historical feature vector is a nearest neighbor to the new feature vector.

14. The computer program product of claim 13, wherein the distance is a generalized average distance between the historical feature vector and the new feature vector.

15. The computer program product of claim 9, wherein the historical feature vector is a nearest neighbor to the new feature vector, wherein the nearest neighbor is determined by sampling the historical consumers and comparing distances from each of the historical consumers.

16. The computer program product of claim 15, wherein the distance is a generalized average distance between the historical feature vector and the new feature vector.

17. A recommendation training system comprising:
a memory; and
a processor communicatively coupled to the memory, wherein the processor is configured to perform a method comprising:

defining a consumer feature vector, wherein the consumer feature vectors includes attributes of historical consumers that impact an individual-item model;

calculating a historical feature vector relating to the historical consumers, the historical feature vector having attribute values of the attributes defined by the consumer feature vector;

determining a retraining threshold for the individual-item model;

calculating a new feature vector relating to new consumers, the new feature vector having new attribute values of the attributes defined by the consumer feature vector;

determining a distance between the historical feature vector and the new feature vector; and retraining the individual-item model upon determining that the distance between the historical feature vector and the new feature vector exceeds the retraining threshold.

18. The system of claim 17, wherein the consumer feature vector includes numerical attributes of the historical consumers and categorical attributes of the historical consumers.

19. The system of claim 17, wherein the attribute values are averages taken from the attributes of the historical consumers, and wherein the new attribute values are the averages taken from the attributes of the new consumers.

20. The system of claim 19, wherein the distance is a length of difference between the historical feature vector and the new feature vector.

\* \* \* \* \*